US010445666B1

(12) United States Patent
Lopez et al.

(10) Patent No.: US 10,445,666 B1
(45) Date of Patent: Oct. 15, 2019

(54) PERSONALIZED TRAVEL ITINERARY PLANNING

(71) Applicant: Amazon Technologies, Inc., Reno, NV (US)

(72) Inventors: Gustavo Eduardo Lopez, Seattle, WA (US); Aditya Balwant Pande, Seattle, WA (US); Wesley Shawn Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 706 days.

(21) Appl. No.: 14/206,802

(22) Filed: Mar. 12, 2014

(51) Int. Cl.
*G06F 17/30* (2006.01)
*H04L 29/06* (2006.01)
*H04L 29/08* (2006.01)
*G06Q 10/02* (2012.01)

(52) U.S. Cl.
CPC ................................ *G06Q 10/025* (2013.01)

(58) Field of Classification Search
CPC .... G06Q 10/02; G06Q 10/0631; G06Q 50/01; G06Q 50/14; G06Q 10/1097; G06Q 10/025; G06Q 10/06311; G06Q 30/0613; G06Q 50/12; G01C 21/3415; G01C 21/3423; G01C 21/343
See application file for complete search history.

(56) References Cited

U.S. PATENT DOCUMENTS

2009/0216633 A1* 8/2009 Whitsett ................ G06Q 30/02 705/14.36
2014/0278605 A1* 9/2014 Borucki ............. G06Q 30/0617 705/5

* cited by examiner

*Primary Examiner* — Maroun P Kanaan
(74) *Attorney, Agent, or Firm* — Lee & Hayes, P.C.

(57) ABSTRACT

This disclosure describes, in part, techniques and systems for creating personalized travel itineraries for users. The personalized itineraries may be created by analyzing prior travel preferences of a user to suggest various locations, activities, time frames, transportation, and/or lodging to the user. In some instance, the personalized itineraries may be created by comparing data associated with the user with data associated with a group of other users to determine a similarity between the user and other users within the group of other users. Where a similarity exists, an itinerary provider may create an itinerary for the user based on the travel preferences of the user and the prior behavior of the similar users.

20 Claims, 5 Drawing Sheets

PERSONALIZED TRAVEL ITINERARY PLANNING

BACKGROUND

When creating a travel itinerary, a user traditionally must utilize a large number of separate resources (e.g., web sites, travel books, etc.) to determine their travel plans. For instance, a user wishing to visit New York City for the first time would typically need to access at least several websites to determine how to travel (e.g., via airplane, bus, etc.); where to stay (e.g., hotel, hostels, etc.); and/or which attractions to visit (e.g., landmarks, historical sites, dining options, entertainment options, art exhibits, etc.), which may require a great amount of time. In some instances, the separate resources may not provide information that is customized based on the user's travel preferences and/or information that is trusted by the user. Additionally, the user may have certain travel parameters (e.g., budget, travel dates, etc.) that may make it difficult to utilize these resources. As such, using existing resources, creating a personal travel itinerary can be costly, time intensive, inefficient, and frequently frustrating for the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for creating personalized travel itineraries for users. A personalized travel itinerary may include transportation options for traveling to/from, and/or within, one or more destinations, a suggested length of time at each destination, suggested lodging at each destination, and/or recommended activities (e.g., landmarks, dining, museums, etc.) at each destination. In some implementations, a personalized travel itinerary may provide a user with suggestions related to travel between multiple destinations or may provide suggestions related to travel within a particular destination.

In some implementations, a personalized travel itinerary for a destination may be created for a user by analyzing known data associated with the user and known data of a group users to determine which user(s) from the group may be similar to the user, which may be based on collaborative filtering techniques. In this instance, the system may suggest a personalized travel itinerary to the user based on the data of the similar user(s) who have previously travel to the destination. In some implementations, when the system is unable to identify users that are similar to the user, the personalized travel itineraries may be created for the user by analyzing the known data associated with the user learned from training data, which may be based on machine learning techniques. In some implementations, the system may produce a personalized travel itinerary by using a combination of these, or other techniques.

To illustrate, envision a user who utilizes the system described herein to create a personalized itinerary for a seven day trip to New York City. The system may use data or inputs directly from the user to create the personalized itinerary. For instance, the user may input a total trip budget, attractions or activities in the New York City area that the user desires to visit or engage in, and/or time constraints for the trip. In addition, the system may access data provided by the user or other data associated with the user to create the personal itinerary. For instance, the system may determine transportation preferences of the user based on transportation utilized by the user at other, previous destinations (e.g., method, cost, time of day, etc.), lodging preferences of the user based on lodging utilized by the user at other destinations (e.g., cost, proximity to attractions, room size, etc.), budgets for previous trips to other destinations, and/or the number of, type and an amount of time spent at attractions visited during previous trips to other destinations.

The system may utilize these travel preferences or other inputs (e.g., travel book reviews, product rating, etc.) to locate one or more similar users who have also visited the destination to be visited by the user, such as New York City in the above example. As a result, the system may suggest one or more personalized itineraries based on how the one or more similar users planned their trips for that particular destination (i.e., New York City). For example, if a similar user decided to visit Carnegie Hall while in New York City, the system may personalize the user's itinerary by including a visit to Carnegie Hall.

In some implementations, the system builds each personalized itinerary in a hierarchical order based on the user data available to the system. That is, the system may first look for inputs corresponding to the desired destination(s). In this example, the desired destination is New York City. In other implementations, there may be multiple destinations desired for a single trip (e.g., New York City, Boston, and Philadelphia). Next, the system may look for inputs corresponding to a time constraint on the desired trip (e.g., seven days, five hours, etc.). In some instances, the system may subsequently look for input in a particular order corresponding to one of transportation, lodging, specific activities, for example. In some implementations, the inputs at each level of the hierarchy may affect the options at a lower level of the hierarchy. Conversely, an input at a lower level of the hierarchy may cause a change in the personal itinerary at a higher level. For example, suppose the user selects a large number of specific activities that may be impossible to complete within the user inputted time constraint for the entire trip. In this example, the system may suggest that the user consider increasing the time constraint for the entire trip to accommodate the large number of desired specific activities, or that the user should consider canceling at least one of those activities. This is merely an example of a hierarchical order. In other implementations, the system may utilize any number of other hierarchical orders for receiving and analyzing inputs to produce a personalized itinerary for a user.

In some implementations, the system may statically generate the personalized itinerary for a user prior to travel. That is, the itinerary may be fixed once a user accepts the inputs at each level of the hierarchy. However, in other implementations, the system may dynamically generate the personalized itinerary while a user is traveling or consuming the personalized itinerary. In some implementations, the system may account for changed and/or updated travel circumstances at any level of the hierarchy in order to modify the personalized itinerary. For example, the system may account for a change in weather which makes an activity on the personalized itinerary inaccessible or a transportation option inappropriate. The system may also modify the personalized itinerary if it is determined that the user spends an amount of time engaging in a particular activity that exceeds the allotted or suggested amount of time for that activity pursuant to the personalized itinerary.

The suggested itineraries may include a link to one or more booking or purchasing applications, an attached document, a telephone number to call so the user may book transportation, purchase event tickets, and/or make lodging reservations, for example. In some implementations, the suggested itineraries may present deals or discounted purchase prices for transportation, events, hotels, etc., included in the personalized itinerary. In some implementations, a deal may be an offer, an advertisement, a discount, and so forth.

The techniques of creating a personalize travel itinerary may be implemented in a number of ways. Example implementations are provided below with reference to the following figures.

Illustrative Environment

Figure 1:
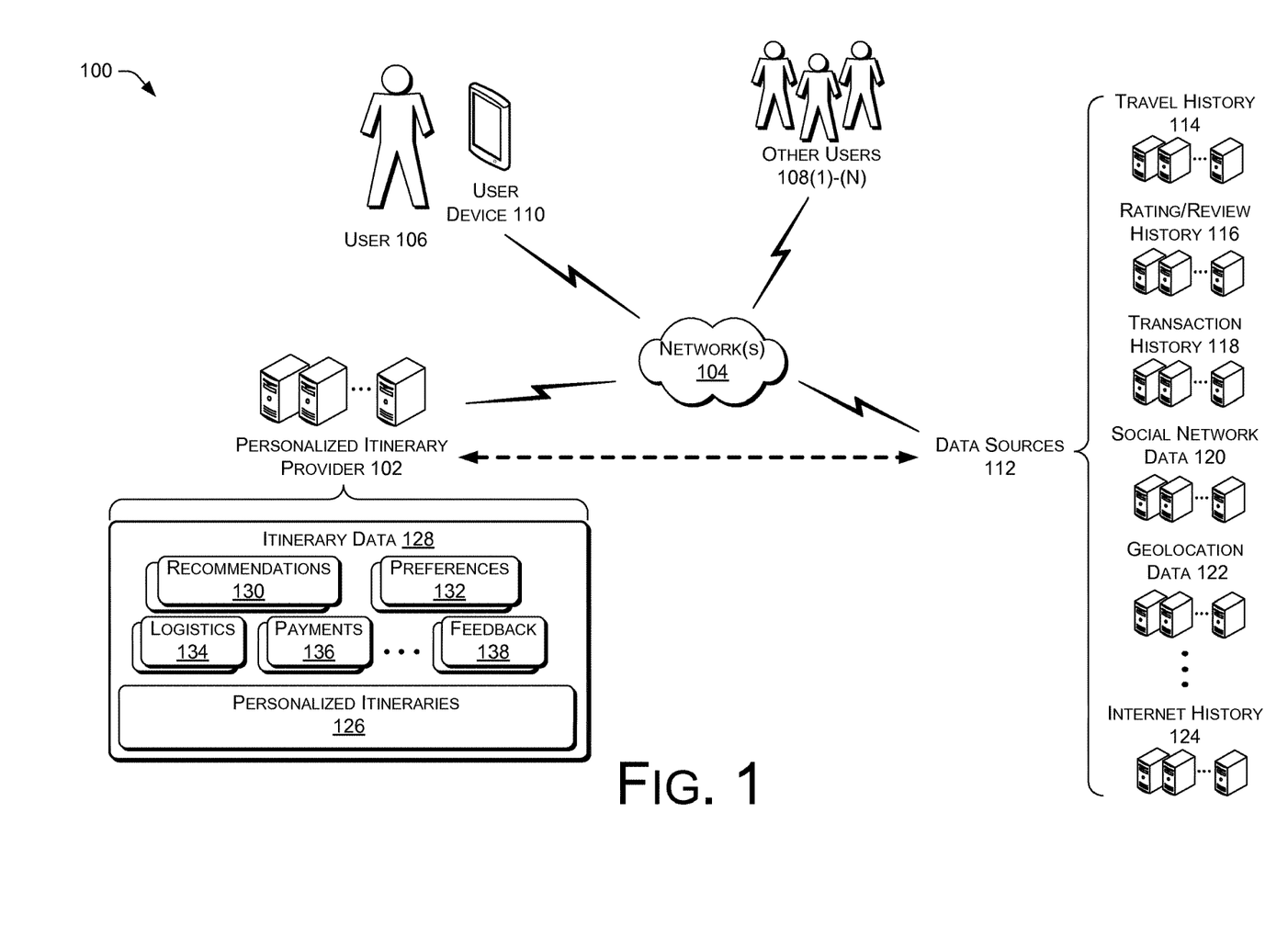
FIG. 1 is a schematic diagram of an illustrative computing environment to provide a personalized itinerary to a user.

FIG. 1 is schematic diagram of an illustrative environment 100 for providing a personalized travel itinerary. As illustrated, environment 100 may include a personalized itinerary provider 102 ("itinerary provider"). The itinerary provider 102 may be hosted by one or more computing devices or servers and may communicate with other computing devices or servers via one or more networks 104. The networks 104 may include wireless and/or wired networks, including mobile telephone networks, wide area networks (WANs), and so forth.

The itinerary provider 102 may communicate with one or more users, which may include user 106 and the other users 108(1)-(N). User 106 may use a device 110 to communicate with the itinerary provider 102 for requesting and/or consuming a personalized itinerary. The device 110 may include virtually any type of electronic device or computing device that can exchange information with another device. For example, the devices 110 may be any one or more of mobile telephones, smart telephones, notebook computers, tablets, gaming consoles, desktop computers, music players, electronic book (eBook) reader devices, vehicle computing devices, kiosks, and/or other types of electronic devices. The itinerary provider 102 may provide the personalized itinerary to the device 110 (or any other device) through a browser, a dedicated application or "app", and/or through messaging services such as short message service (SMS), email, and other messaging services.

As mentioned above, the itinerary provider 102 may utilize data from the other users 108 to determine which of the other users 108 may have data similar to user 106, which may indicate that the user 106 and the users 108 have common interests and/or preferences. In some instances, the itinerary provider 102 may utilize data from the other users 108 that have previously employed the itinerary provider 102 to produce a personalized itinerary for the other user(s) 108. In some instances, the itinerary provider 102 may utilize data from data sources 112 in addition to the data available to the itinerary provider 102. As illustrated, the itinerary provider 102 may communicate with the data sources 112 via the networks 104 to access various types of information, which may be used to assist the itinerary provider 102 in determining which of the other users 108 may be similar to user 106, and which may allow the itinerary provider 102 to create a personalized itinerary for the user 106. In some implementations, the data sources may also include various types of information about the user 106.

The data sources 112 may include behavioral data for and/or inputs from user 106 and/or other users 108. For instance, the data associated with the data sources 112 may include previous travel history 114, rating/review history 116, transaction history 118, social network data 120, geolocation data 122 and/or internet search history 124, among other possible sources of information. In some implementations, the data sources 112 may include data provided by a third party. In some implementations, the data sources 112 may be accessible via public or private data repositories available to the itinerary provider 102. For instance, itinerary provider 102 may store, or at least have access to, the data associated with the data sources 112.

The travel history 114 may include information that is stored by, or that is supplemental to, the itinerary provider 102 about previous travel actions of the user 106 and/or the other users 108. The previous travel actions may include data about previous travel planned and executed (or possibly not executed), previous travel destinations visited, including events or activities at each destination, lodging accommodations used, transportation used to travel at each destination or between destinations, and so forth. The previous travel history 114 may also include explicit user travel preferences, such as type or location of hotels that the user prefers, preferences for travel modes, and so forth. However, this type of information may be extracted from past recorded activities of the user 106 or the other users 108.

The rating/review history 116 may include information about activities of the user 106 and/or the other users 108 that may be collected from published notifications about the review or rating of various items (i.e., books, artwork, sports memorabilia, food, films, videos, etc.); venues (i.e., restaurants, bars, museums, art exhibits, landmarks, theme parks, beaches, performances, music venues, etc.); and/or ratings relating to travel (i.e., airline reviews, airport review, hotel reviews, car rental ratings, etc.).

The transaction history 118 may include data about previous merchant interactions of the user 106 and/or the other users 108. The data may include purchased items (i.e., goods or services) from an electronic marketplace, browsed items from an electronic marketplace, items placed in a virtual shopping cart of an electronic marketplace, items the user 106 searched for, items placed in a saved-items list (e.g., a wish list), and/or other types of data that may be used to indicate preferences of the user.

The social network data 120 may include activities and indications of preferences of activities for the user 106 and/or the other users 108. For instance, the social network data 120 may be used to identify activities engaged in by contacts of the user 106 and/or the other users 108. The social network data 120 may further indicate preferences of the user and/or other users 108, such as by information accessed by the user 106, a length of the access, contacts' interactions, and so forth.

The geolocation data 122 may include data about a location of an electronic device associated with the user 106 and/or the other users 108. For instance, the electronic device may allow for tracking services such as using global position system(s) (GPS) to determine the real world geographic location of the electronic device at a particular time. In some instance, the geolocation data 122 may include data about a length of time the user 106 and/or the other users 108 remained at a specific location. The geolocation data 122 may indicate the current location of the user 106 and/or the other users 108 and/or previous locations visited by the user 106 and/or the other users 108.

The internet search history 124 may include data about websites that the user 106 and/or the other users 108 may have previously visited. For instance, the internet search history 124 may be used to identify websites associated with a specific travel destination, an airline, a travel reference, a sports team, a museum, and so forth. The data indicating the internet search history 124, like the other types of data from the data sources 112, may be used to determine preferences or interests of the user 106 and/or the other users 108. In some instances, as described above, these preferences or interests may indicate similarities between the user 106 and one or more of the other users 108.

In various implementations, other types of supplemental data may also be accessed by the itinerary provider 102, including information available via the Internet and/or other public and/or private repositories of information.

The itinerary provider 102 may generate a personalized itinerary 126 including itinerary data 128 that is to be presented to the user 106. In some implementations, the personalized itinerary 126 may be generated by, for example, analyzing data communicated by the user 106 to the itinerary provider 102, analyzing data communicated by the other users 108 to the itinerary provider 102, and/or analyzing data from the data sources 112 for the user 106 and/or the other users 108, to determine which of the other users 108 are likely to share similar data with the user 106. In some instances, the itinerary provider 102 may generate a plurality of personalized itineraries 126 for user 106.

The itinerary data 128 may include information based on the behavior of the other similar user(s) 108 during their previous travel. For instance, the itinerary data 128 may include recommendations 130 (e.g., transportation options, suggested activities, lodging recommendations, etc.) based on the actions of the similar user(s). For instance, if it is determined that one of the similar users enjoyed a particular hotel at a destination that is to be visited by the user 106, the itinerary provider 102 may recommend that hotel to the user 106. In some implementations, the itinerary data 128 may include preference data 132 input directly by the user 106 and/or gathered from the data sources 112. For instance, this preference data 132 may include travel time constraints of the user 106, specific activities the user 106 wishes to avoid, hotel room size, and so forth. In addition, the itinerary data 128 may include logistical information 134 to coordinate transportation and activities, payment information 136 for purchasing some portion or all of the items included in the itinerary (e.g., hotels, airfare, activities, etc.), feedback information 138 for adjusting the generated itinerary, and/or other relevant information to enable the user 106 to provide input to further customize the personalized itinerary 126 and ultimately to have a positive experience while visiting the destination.

The compiled itinerary data 128 may be used to generate one or more personalized itineraries 126 for the user 106. The personalized itinerary 126 may include various suggestions for travel, lodging, and/or selected activities, times for the travel and activities (which may be adjusted in advance or during the activity), and possibly alternative or contingency activities, among other possible content and information. In some implementations, each itinerary may include the reasoning for the suggestions. The one or more personalized itineraries 126 may be presented to the user 106 in any manner, such as via a website, an e-mail, an application associated with the itinerary provider 102 and residing on the user device 110, and so on. Moreover, the user 106 may access the one or more personalized itineraries anytime before, during, or after the user's 106 visit to the destination(s).

Illustrative Computing Architecture

Figure 2:
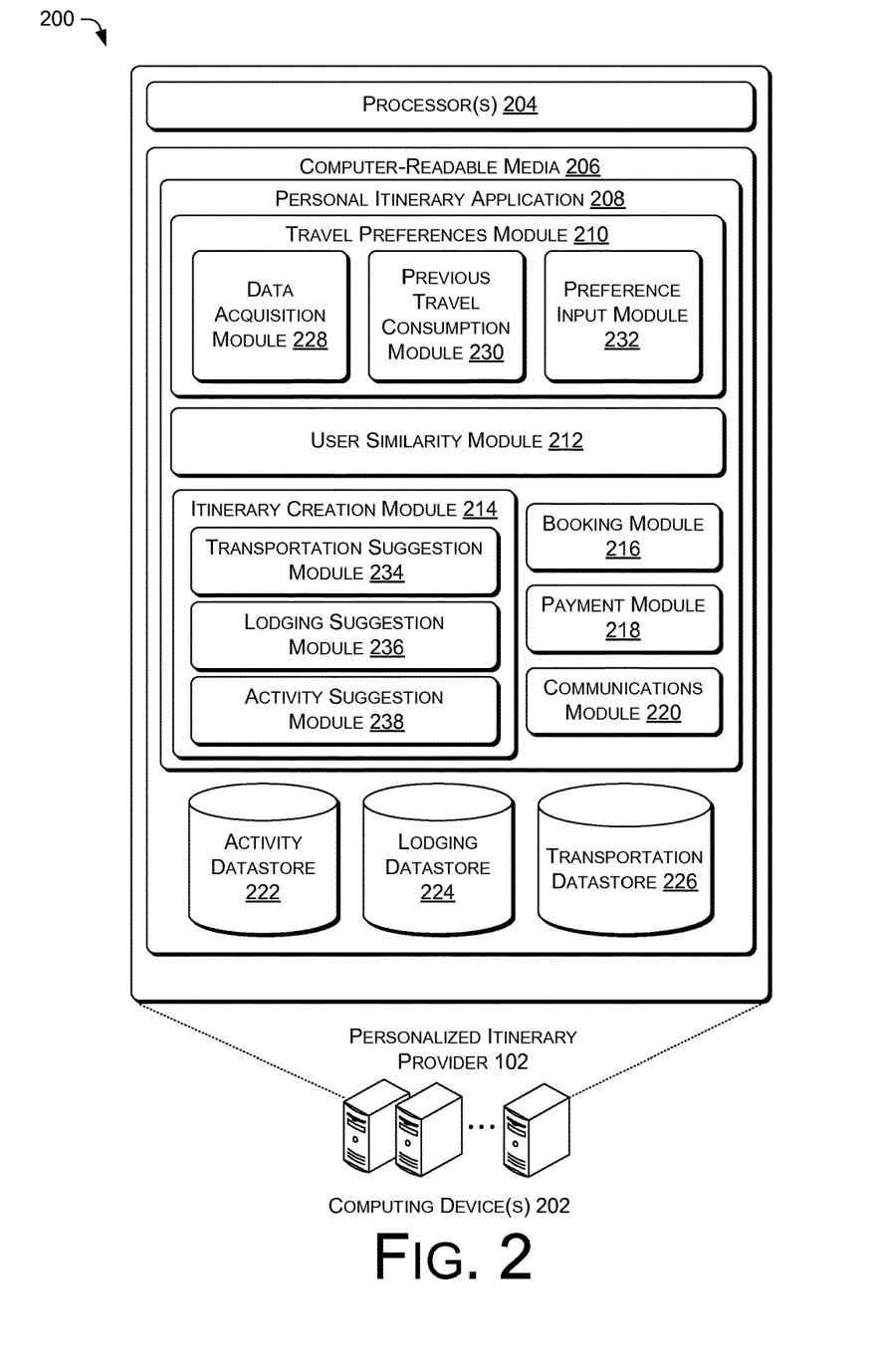
FIG. 2 is a block diagram of an illustrative computing architecture to provide a personalized itinerary to a user by a personalized itinerary provider.

FIG. 2 shows a block diagram of an illustrative computing architecture 200 to provide one or more personalized itineraries by the itinerary provider 102. The computing architecture 200 may include one or more computing devices 202 that may be implemented in a distributed or non-distributed computing environment.

The computing devices 202 may include one or more processors 204 and one or more computer-readable media 206 that stores various modules, applications, programs, or other data. The computer-readable media 206 may include instructions that, when executed by the one or more processors 204, cause the processors to perform the operations described herein for the itinerary provider 102.

Implementations may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some implementations, the computer-readable media 206 may store a personal itinerary application 208 ("itinerary application"). The itinerary application 208 may include various modules, such as a travel preference module 210, a user similarity module 212, an itinerary creation module 214, a booking module 216, a payment module 218, a communications module 220, each of which are described in detail below. The modules may be stored together or in a distributed arrangement. In some implementations, the modules may represent services that may be performed using components that are provided in a distributed arrangement, such as by virtual machines running in a cloud computing environment. In some implementations, one or more datastores may be included in the computing architecture 200, accessible by the computing device 202 and the itinerary application 208. The one or more datastores may include an activity datastore 222, a lodging datastore 224, and a transportation datastore 226.

As mentioned above, the itinerary application 208 may include the travel preference module 210. In some implementations, the travel preference module 210 may identify, categorize, and/or rank information to determine one or more travel preferences of a user. The travel preferences may be preferences for activities, lodging, transportation, meals, beverages, and so forth. The travel preference module 210 may determine preferences of the user 106 from direct input (selections by user) and/or by inferring preferences from other data associated with the user. For instance, the data utilized by the travel preference module 210 may be accessed by a data acquisition module 228 communicating and acquiring data from the data sources 112.

In some implementations, the information utilized by the travel preference module 210 to determine a user's travel preferences may be provided by a previous travel consumption module 230 and/or a preference input module 232. In some implementations, the previous travel consumption module 230 may store information relating to a user's previous travel or previously executed trips in order for the travel preference module 210 to determine the travel preferences of the user 106. In some implementations, the previous travel consumption module 230 may store information related to previous itineraries generated by the itinerary application 208 and consumed by a user 106.

The preference input module 232 may utilize the user's direct input as information, as compared to inferring a user preference from the data sources 112 or previous travel consumption, to allow the travel preference module 210 to identify a travel preference for the user 106. In some implementations, the preference input module 232 may receive information for a user 106, such as travel constraints, travel budget, specific activities the user 106 would like to engage in, or other specific travel details.

As mentioned above, the itinerary application 208 may include a user similarity module 212 to identify other user(s) 108 who have at least similar preferences to a user 106 seeking a personalized itinerary. In some implementations, the user similarity module 212 may identify other users who have previously visited a travel destination that user 106 is interested in creating a travel itinerary for. In other implementations, the user similarity module 212 may identify other users who have visited a different travel destination that is determined to have characteristics similar to a travel destination for which the user 106 is creating a travel itinerary. In some implementations, the similar preferences may be similar travel preferences; however, the similarities between the other users and the user seeking a personalized itinerary may be of another type. For instance, the similarities may include similar purchase history of items from an online merchant, similar reviews of items (e.g., products, services, etc.), similarities based on personal data for the users (e.g., age, gender, employment, number of children, etc.). In some implementations, the user similarity module 212 may communicate with and acquire data from the data sources 112 to compare with the user preference(s) identified by the travel preferences module 210.

In some implementations, the user similarity module 212 may rank the determined similar other users 108 based on the highest correlation of similarities. In some instances, the user similarity module 212 may give greater weight to similarities based on previous travel behavior over similarities based on previous behavior not related to travel.

In some implementations, the itinerary application 208 may utilize the user preferences identified by the travel preference module 210 and information about similar users determined by the user similarity module 212 to create a personalized travel itinerary. In some implementation, the itinerary application 208 may include an itinerary creation module 214 which may analyze the identified user preferences and/or user similarity data to suggest various activities for consumption by the user while traveling, lodging options for the user while traveling, and/or transportation options for the user while traveling.

The itinerary creation module 214 may include a transportation suggestion module 234, a lodging suggestion module 236 and an activity suggestion module 238. The transportation suggestion module 234 may access the transportation datastore 226 to suggest transportation options to include with a personalized itinerary. In some instances, the transportation suggestion module 234 may suggest transportation between cities when the itinerary may involve travel between multiple destinations (e.g inter-city travel). In some instance, the transportation suggestion module 234 may suggest transportation between activities in at a single travel destination (e.g., intra-city travel). The transportation suggestion module 234 may include suggestions for the type of travel (airplane, boat, car, bus, etc.), the timing of transportation (red-eye flights), cost and so forth.

In some implementations, the transportation suggestion module 234 may receive the identified user preferences from the travel preferences module 210 and access the transportation datastore 226 to determine which transportation options the user might prefer based on the received user preferences. In some implementations, the transportation suggestion module 234 may suggest transportation based on the transportation behavior undertaken by one or more similar users determined by the user similarity module 212.

The lodging suggestion module 236 may access the lodging datastore 224 to suggest lodging options to include with a personalized itinerary 126. The lodging options may include location of lodging (i.e., proximity to activities, in city center, etc.), cost, room size/options, available amenities (e.g., spa, pool, room service, etc.), type (hotel, hostel, bed and breakfast, etc.) and so forth. Similar to the transportation suggestion module 234 described above, the lodging suggestion module 236 may account for the identified travel preference of the user determined by the travel preferences module 210. In addition, the lodging suggestion module 236 may suggest lodging based on the lodging behavior undertaken by one or more similar users determined by the user similarity module 212.

In some implementations, the activity suggestion module 238 may access the activity datastore 222 to retrieve suggested activities to be included in a personalized itinerary. The activities may include festivals, exhibits, sporting events, parks, landmarks, music concerts, restaurants, shopping locations, and so forth, at each travel location. For instance, the activity suggestion module 238 may receive the identified user preferences from the travel preferences module 210 and, in some implementations, access the activity datastore 222 to determine which one or more activities the user might enjoy based on the received user preferences.

In some implementations, the activity suggestion module 238 may suggest activities based on activities undertaken by one or more similar users determined by the user similarity module 212. For instance, where the user similarity module 212 determines that a similarity between a first user and a second users may exist based on, for example, each user's purchasing behavior at an online merchant, the activity suggestion module 238 may suggest activities to the first user where the second user provides an indication that the second user previous attended, and liked, the activity. Thus, since the second user selected and liked the activity at the destination, there is an increased chance that the first user will also select and like the activity at the destination.

The itinerary application 208 may also include a booking module 216. The booking module 216 may be used to book the suggested activities, lodging, and/or transportation included in the personalized itinerary. In some implementations, the booking module 216 may also indicate special pricing or deals on the suggested activities, lodging, and/or transportation included in the personalized itinerary. For instance, the booking module 216 may be used to initiate the purchase of the suggested activities, lodging, and/or transportation. In some instance, the itinerary application 208 may have access to a special purchasing offer for one or more of the suggested items in the personalized itinerary.

The payment module 218 may obtain access to payment accounts and/or payment instruments of a user to complete the purchase of one or more of the suggested activities, lodging, and/or transportation included in the personalized itinerary. The payment module 218 may also allow the user to pay the itinerary provider 102 for any fees associated with creating the travel itinerary.

The communications module 220 may provide communications and/or other data to the user to facilitate the collection of data, such as account data, payment information, etc. The communications module 220 may facilitate feedback from a user and communications between a user and the itinerary application 208 to refine the generated personalize itinerary. For instance, the communications module 220 may allow a user to communicate with the itinerary creation module 214 to indicate that one or more of the suggested activities, lodging, and/or transportation may be duplicative, already completed, undesirable, and so forth. As a result, the itinerary creation module 214 may modify the generated personalized itinerary. The communications module 220 may be used by other modules described herein to provide related communications.

In various embodiments, the process of creating a travel itinerary 126 may be performed utilizing collaborative filtering and/or machine learning techniques (e.g., supervised learning, unsupervised learning, etc.) with respect to a set of training data.

Illustrative Operations

Figure 3:
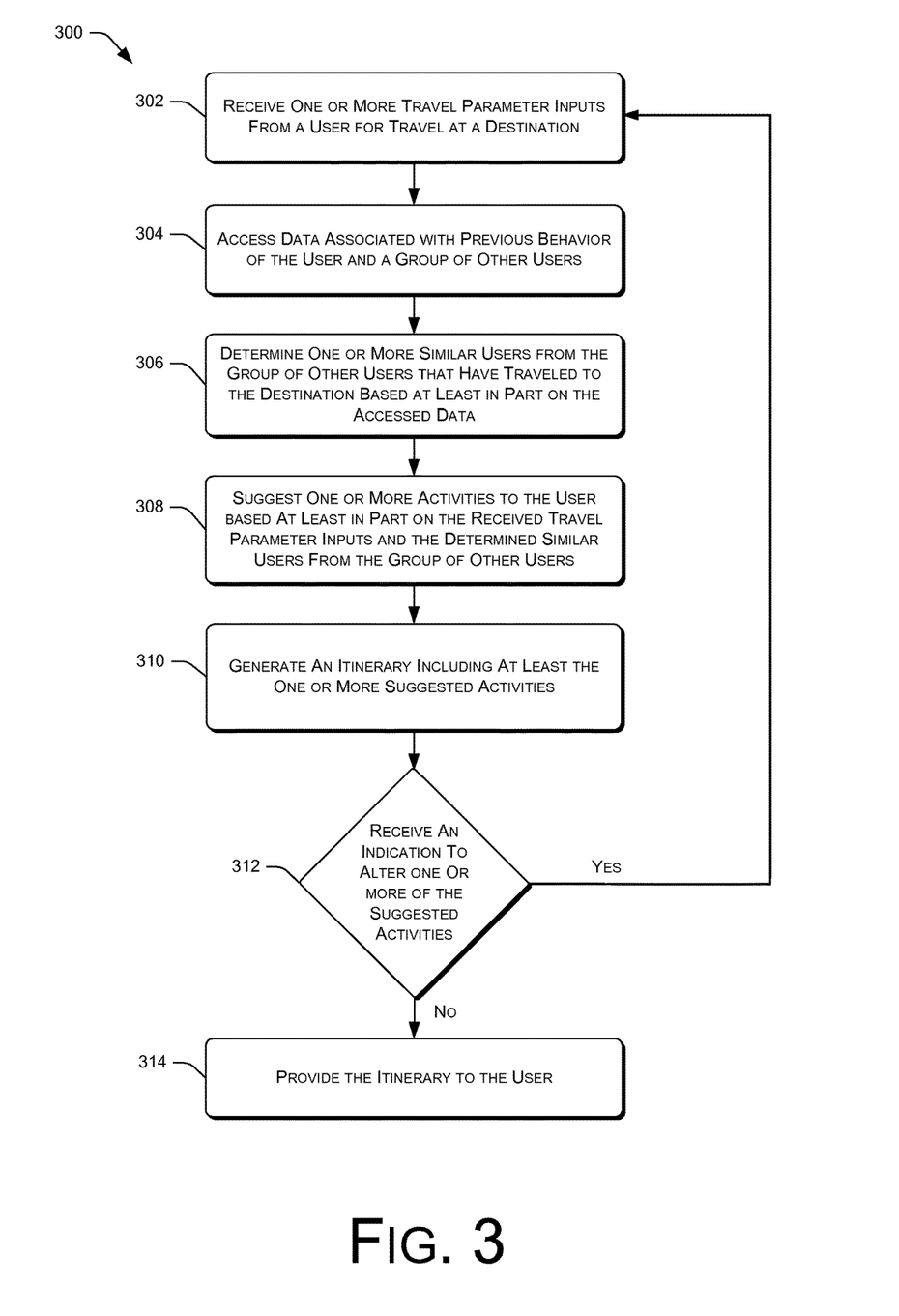
FIG. 3 is a flow diagram that illustrates an example process of generating a personalized itinerary from user similarity data including one or more suggested activities at a destination.
Figure 4:
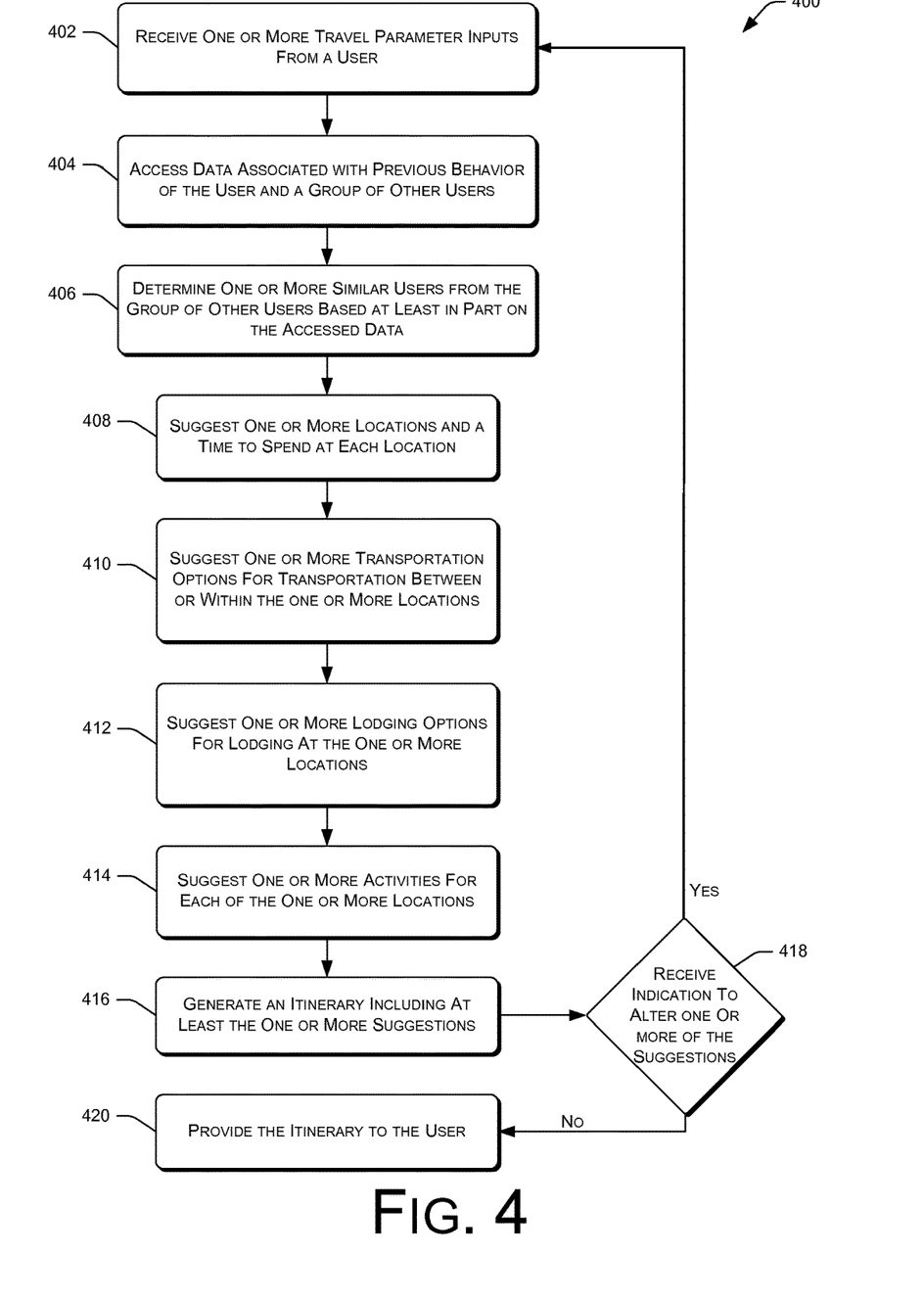
FIG. 4 is a flow diagram that illustrates an example process of generating a personalized itinerary from user similarity data including suggestions for locations at a destination, transportation between or within each location, and lodging at each location.
Figure 5:
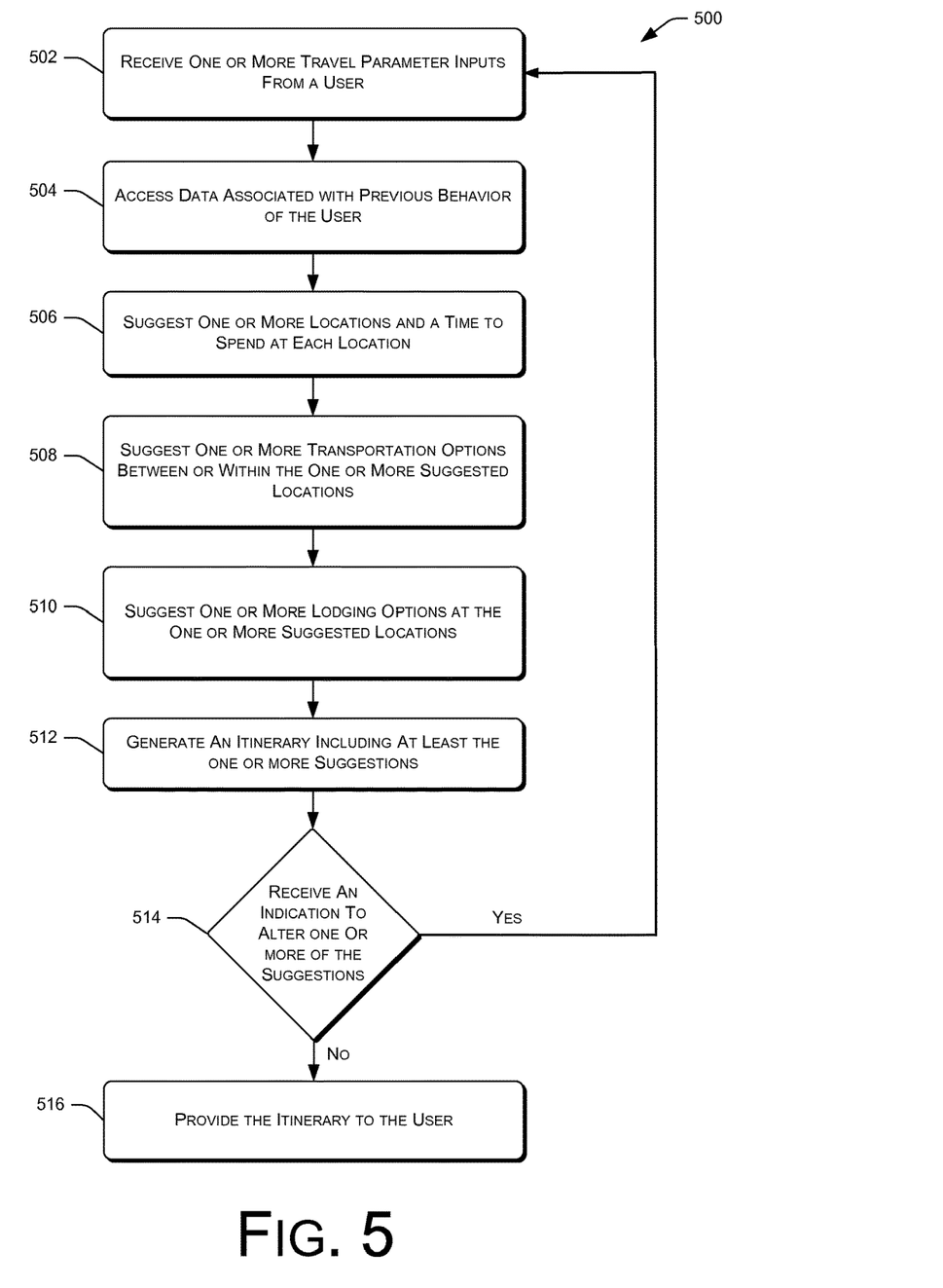
FIG. 5 is a flow diagram that illustrates an example process of generating a personalized itinerary from previous behavioral data.

FIGS. 3-5 are flow diagrams of illustrative processes for implementing the techniques described above of creating a personalized travel itinerary. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Furthermore, the processes are described with reference to the environment 100 and may be performed by the computing architecture 200. Of course, the processes may be performed in other similar and/or different environments.

FIG. 3 is a flow diagram of an illustrative process 300 to provide a personalized travel itinerary to a user, where the itinerary may include various suggested activities at a particular destination. In some implementations, the particular destination may be a specific country, a specific city within that country, or a specific neighborhood of the city. In some implementations, since the particular destination may be known, the itinerary application 208 may refrain from making suggestion associated with transportation and/or lodging. However, in other implementations, the itinerary application 208 may provide one or more suggestion for transportation between specific areas (e.g., neighborhoods, blocks, boroughs, districts, etc.) within the particular destination. For instance, the itinerary application may suggest a route and/or method of travel (taxi, subway, bus, foot, bike, etc.) between an activity in Brooklyn and an activity in Manhattan, both of New York City.

At 302, the travel preference module 210 may receive one or more travel parameter inputs for travel at a destination from a user of the itinerary application 208. The travel parameter inputs may indicate user preferences received by the preference input module 232 and may include a budget, travel dates, locations the user would like to visit at the destination, and/or specific lodging at the destination, for example. In the context of the New York City example, the travel preference module 210 may receive inputs that the user 106 will be in New York City in July and they would like to visit a particular restaurant on their visit.

At 304, the travel preference module 210 may access data associated with previous behavior of the user 106 and previous behavior of other users 108. In some implementations, the data associated with previous behavior of the user 106 and previous behavior of other users 108 may be acquired from data sources 112 and/or received as direct inputs from the user 106 or other users 108. The previous behavior may be associated with prior travel such as prior activities undertaken at various destinations, past travel budgets, prior travel destinations, and so forth. However, in some implementations, the previous behavior may include data other than travel data such as item transaction history, video view behavior, eBooks read, annotations/comments in an eBook, item rating/review, social media data, and so forth. As mentioned above, the previous behavior of the user 106 and the other users 108 may indicate a similarity between the user 106 and at least one other user 108.

At 306, the user similarity module 212 may determine one or more other users 108 that may be similar to the user 106 based on the accessed data associated with the previous behavior. For example, the user similarity module 212 may determine that the user 106 and the one or more other users 108 share common interests, travel preferences, etc. In addition, the user similarity module 212 may determine from the accessed data which of the other user 108 have previously travel to the particular destination, in this example, New York City. In some implementations, the user similarity module 212 may also analyze the accessed data to determine which other users 108 may be similar to the user 106. For instance, the user similarity module 212 compares the previous behavior data of the user 106 to the previous behavior data of the other user 108 to determine which of the other users 108 may be similar to the user 106. In some instances, a similarity may be determined if the user 106 and the other user(s) 108 have comparable item transaction histories, video view behavior, eBooks read, annotations/comments in an eBook, item ratings/reviews, and/or social media data.

The user similarity module 212 may rank and weight the determined similarities between the user 106 and the other user(s) 108, if needed. In some implementations, the user similarity module 212 may account for similarity strength or a number of similarities to determine which other users 108 may be more similar to the user 106.

At 308, the activity suggestion module 238 of the itinerary creation module 214 may suggest one or more activities to the user 106 based at least on the travel parameter inputs received at 302 and the similar other users 108 determined at 306. For instance, the activity suggestion module 238 may suggest one or more activities undertaken by the similar other user(s) 108 while the other user(s) 108 traveled at the particular destination.

In some implementations, the suggestion of the one or more activities may optimize the time and location of the user 106. For instance, the activity suggestion module 238 may suggest the one or more activities such that each suggested activity may be enjoyed by the user in a time sequential manner and/or may suggest the one or more activities based on the times in which each of the one or more activities are available. In some implementations, the activity suggestion module 238 may refrain from suggesting one or more activities where each of the activities may only be available at the same time. For instance, the activity suggestion module 238 may not suggest an activity, such as a theatrical performance, occurring at substantially the same time as a different activity, such as a sporting event.

In some implementations, the activity suggestion module 238 may filter the one or more suggested activities based on the distance between the one or more activities, transportation time between the activities, the time in which the one or more activities are available, etc. For instance, in the context of the New York City example, the activity suggestion module 238 may only suggest activities where: each of the activities resides in a same neighborhood (e.g., Manhattan) and/or one activity is within a walking distance of the other activities.

At 310, the itinerary creation module 214 may generate a personalized itinerary for the user 106 that includes the one or more suggested activities. In some implementations, a plurality of personalized itineraries may be generated for user 106. The plurality of personalized itineraries may each include a different number and/or type of suggested activities. In the context of the example above, the itinerary creation module 214 may generate a personalized itinerary for New York City including a suggested restaurant and museum exhibit, where the determined similar other users 108 also enjoyed the suggested restaurant and museum exhibit.

In some implementations, the generated personalized itinerary may include additional information for the user 106. For instance, each generated personalized itinerary may include activities to avoid based on user 106 preferences or a poor experience experienced by a similar other user 108, an estimated or recommend amount of time needed to complete each suggested activity, a cost of each suggested activity, a location and/or map of each suggested activity, and/or a recommendation for transportation between each suggested activity. Furthermore, the generated personalized itinerary may include reasons indicating why the activity was suggested. For instance, the itinerary may detail that the activity, such as visiting a landmark, was suggested because it had significance to a book that the user 106 had previously purchased.

At 312, the itinerary application 208 may receive an indication, via communications module 220, to alter one or more of the activity suggestion in the personalized itinerary. In some implementations, such an indication, if received, may be utilized as further travel parameter inputs at 302, thus restarting the process 300 for generating a personalized itinerary for the user 106. In some implementations, the indication may be received from the user 106 and/or inferred from data from the data sources 112. For instance, the geolocation data 112 may provide an indication, via the data acquisition module 228, that the user 106 has remained at a first suggested activity longer than initially suggested. As a result, the itinerary creation module 214 may dynamically update the one or more suggested activities to account for the time delay at the first suggested activity.

At 314, the itinerary may be provided to the user if no indication to alter the one or more suggestion is received, or before determining if any additional indications are received from the data sources. In various embodiments, the itinerary may be presented to the user 106 in any manner, such as via a site (e.g., website) associated with the itinerary provider 102, an e-mail message, a mobile application, etc.

Moreover, since the processes illustrated in FIG. 3 may be based on two different types of data (i.e., the previous behavior of the user 106 and the previous behavior of other users 108), the personalized itinerary may be created utilizing one or more collaborative filtering techniques.

FIG. 4 is a flow diagram of an illustrative process 400 to provide a personalized travel itinerary to a user, where the itinerary may include various suggested transportation, lodging and/or activities at one or more destinations.

At 402, the travel preference module 210 may receive one or more travel parameter inputs from a user of the itinerary application 208. As described above, the travel parameter inputs may indicate user preferences received by the preference input module 232 and may include a budget, travel dates, travel destinations the user would like to visit, locations the user would like to visit, and/or specific lodging at one or more of the locations. For example, suppose user 106 inputs that they would like to build an itinerary for travel to New Zealand for fourteen days.

At 404, the travel preference module 210 may access data associated with previous behavior of the user 106 and previous behavior of other users 108. For example, the previous travel consumption module 230 of the travel preference module 210 may provide data indicating that the user 106 had previously traveled to Russia and Iceland. In addition, the previous travel consumption module 230 may provide data associated with the user's 106 previous travels. For example, the data may indicate that the user 106 spent one week in Russia visiting St. Petersburg over three days and then traveled by train to Moscow for four days. The user 106 may have spent a week in Iceland and drove via a car to various locations outside of Reykjavik.

In some implementations, the travel preference module 210 may access data associated with previous behavior of the other user 108. As mentioned above, the data may be acquired from one or more data sources 112 and/or received directly from the other user(s) 108 if the other users 108 have used the itinerary application 208 to create or consume a personalized itinerary. In some implementations, the accessed data may indicate previous behavior directly related to travel (itineraries consumed, cities visited, etc.); however, in some implementations, the accessed data may indicate previous behavior not directly related to travel (transaction history, ratings/review history, etc.). In both instances, the data associated with the previous behavior of the user 106 and the previous behavior of other users 108 may be used at 406 to determine whether any other user(s) 108 have interests and/or preferences that are similar to the user 106.

At 406, the user similarity module 212 may determine one or more other user 108 that may be similar to the user 106 based on the accessed data associated with the previous behavior. For instance, the user similarity module 212 may determine from the accessed data which of the other user 108 have previously travel to Russia using a similar seven day itinerary and also visited New Zealand.

At 408, the itinerary creation module 214 may suggest one or more locations within the desired destination to visit and a time to spend at each location. In some implementations, the suggestions may be made based on the highest correlated similar previous travel behavior of the other user(s) 108 to user 106. For instance, the itinerary creation module 214 may suggest for the desired fourteen day trip to New Zealand that the user spend four days in Wellington, one day in Matamata, one day at Milford Sound, two days in the Tasman District, and five days in Auckland. The suggestions in this example may be made based on the highest correlated previous travel behavior for the other user(s) 108 while traveling in New Zealand and who also behaved similarly to user 106 on a seven day trip to Russia. In some implementations, the itinerary creation module 214 may suggest a time to spend at each location that is less (e.g., ten days) than the user input total travel time input (e.g., fourteen days).

At 410, the transportation suggestion module 234 of the itinerary creation module 214 may suggest one or more transportation options to the user 106. The suggested transportation options may be based on the received travel parameters input by the user 106, the data associated with the previous travel behavior of the user 106, and/or the data associated with the previous travel behavior of the other users 108 that are determined to be similar to the user 106. For instance, the transportation suggestion module 234 may utilize data from the determined similar other user(s) 108 to suggest transportation between or within the suggested locations at 408.

At 412, the lodging suggestion module 236 of the itinerary creation module 214 may suggest one or more lodging options to the user 106. For instance, the lodging suggestion module 236 may suggest a hotel at the suggested locations at 408. In some implementations, the lodging suggestion module 236 may analyze the suggested locations and the suggested transportation options to determine that the suggested locations are within a certain proximity from each other and the length or duration of travel is a less than a threshold distance. In those instances, the lodging suggestion module 236 may suggest a single lodging options to the user 106 that allows the user 106 to visit multiple suggested locations.

As described above, the lodging suggestion module 236 may suggest lodging based on the past behavior of the user 106 (i.e., preferences) and/or the past behavior of the determined other user(s) 108. Thus, in the New Zealand example, if the itinerary creation module 214 suggests four days in Wellington, the lodging suggestion module 236 may look at lodging choices of the user 106 in prior trips (e.g., hotel they stay at in Madrid, New York City, Moscow, etc.). In some implementations, these previous hotel choices may be mapped against similar other user(s) 108 to determine one or more suggestions for lodging in Wellington.

At 414, the activity suggestion module 238 of the itinerary creation module 214 may suggest one or more activities to the user 106 at the one or more suggested locations. For instance, the activity suggestion module 238 may suggest that the user 106, while in Wellington, visit a particular merchant to try a local favorite beverage. In some implementations, the activity suggestion module 238 may suggest activities based on the past behavior of user 106 (i.e., preferences) and/or the past behavior of the determined other user(s) 108. In other implementations, the one or more activities may be suggested in conjunction with step 408.

At 416, the itinerary creation module 214 may generate a personalized itinerary for user 106 that includes that one or more suggested transportation options, lodging options and activities for the one or more suggested locations. In some implementations, a plurality of personalized itineraries may be generated for user 106. The plurality of personalized itineraries may each include a different number and/or type of suggested activities. In the context of the example above, the itinerary creation module 214 may generate a personalized itinerary for a fourteen day trip to New Zealand including suggested restaurants and parks based on the previous data of the user 106. In addition, the itinerary creation module 214 may generate the personalized itinerary if the user 106 has selected something similar in a previous trip to a destination and/or determined similar other user(s) 108 also enjoyed the suggested restaurants and parks.

In some implementations, the generated personalized itinerary may be linked to one or more other applications, via the booking module 216, to purchase transportation, lodging, activity admission/tickets and/or or other features to make reservations based on the personalized itinerary.

At 418, the itinerary application 208 may receive an indication, via communications module 220, to alter one or more of the suggestions (i.e., one or more locations, times at each location, transportation options, lodging options, and/or activities) in the generated personalized itinerary. In some implementations, such an indication, if received, may be utilized as a further travel parameter input at 402, thus restarting the process 400 for generating a personalized itinerary for the user 106. In some implementations, the indication may be received from user 106 and/or inferred from data from the data sources 112. For instance, the transaction history data 118 may provide an indication, via the data acquisition module 228, that the user 106 may have a stronger preference or interest for an additional suggested activity. As a result, the itinerary creation module 214 may dynamically update the one or more suggested activities to account for the stronger preference or interest of the user 106.

At 420, the itinerary may be provided to the user if no indication to alter the one or more suggestion is received.

Moreover, since the processes illustrated in FIG. 4 may be based on two different types of data (i.e., the previous behavior of the user 106 and the previous behavior of other users 108), the personalized itinerary may be created utilizing one or more collaborative filtering techniques.

FIG. 5 is a flow diagram of an illustrative process 500 to provide a personalized travel itinerary to a user, where the itinerary may include various suggested transportation, lodging and/or activities at one or more destinations. In this implementation, the various suggested locations, transportation options, lodging options, and/or activities included in the personalized itinerary may be generated from data relating to a user's previous behavior generated from training data. For instance, the personalized itinerary may be generated by utilizing one or more algorithms and/or machine learning techniques (e.g., supervised learning, unsupervised learning, semi-supervised learning, etc.), to identify the various suggested locations, transportation options, lodging options and/or activities. That is, the itinerary creation module 214 (or modules therein) may implement machine learning techniques on a set of training data, which may include the previous inputs for user 106, previous inputs for the other users 108, an/or travel parameters. Utilizing various machine learning techniques, the itinerary creation module 214 (or modules therein) may learn from the training data in order to suggest the various locations, transportation options, lodging options and/or activities.

At 502, the travel preference module 210 may receive one or more travel parameter inputs from a user. As described above, travel parameter inputs may indicate user preferences or travel constraints received by the preference input module 232, and may include a budget, travel dates, cities the user would like to visit, locations the user would like to visit at each city, and/or specific lodging at each city.

At 504, the travel preference module 210 may access data associated with previous behavior of the user 106. For example, the previous travel consumption module 230 of the travel preference module 210 may provide data indicating that the user 106 has previously traveled to other destinations and details about user 106 travels in those other destinations. In some implementations, the accessed data may indicate previous behavior not directly related to travel (e.g., transaction history, ratings/review history, etc.).

A 506, the itinerary creation module 214 may utilize the accessed data to suggest one or more locations within the desired destination to visit and a time to spend at each location. In some implementations, the activity suggestion module 238 of the itinerary creation module 214 may suggest the one or more locations and a time at each location. For instance, the itinerary creation module 214 may determine from the accessed data associated with the previous travel behavior that user 106 demonstrated a preference for visiting a theme park. As such, the itinerary creation module 214 may suggest locations at a destination that include a theme park. In other implementations, the itinerary creation module 214 may determine that the user 106 demonstrated a preference for purchasing music from a particular artist. As such, the itinerary creation module 214 may suggest locations at a destination that include performances by or other information about the artist.

At 508, the transportation suggestion module 234 of the itinerary creation module 214 may suggest one or more transportation options to the user 106. The suggested transportation options may be based on the received travel parameters input by the user 106 and/or the data associated with the previous travel behavior of the user 106. For instance, the transportation suggestion module 234 may utilize data indicating a preference for traveling via a bus, plane, car, train, or the like, to suggest transportation between or within the suggested locations.

At 510, the lodging suggestion module 236 of the itinerary creation module 214 may suggest one or more lodging options to the user 106 at one or more of the suggested locations. The lodging suggestion module 236 may suggest lodging based on the past behavior of user 106 (i.e., preferences). For instance, the lodging suggestion module 236 may utilize data indicating a preference for staying at a hotel, hostel, motel, or the like, to suggest lodging at the one or more of the suggested locations.

At 512, the itinerary creation module 214 may generate a personalized itinerary for the user 106 that includes the one or more suggested transportation options, lodging options, and/or one or more suggested activities at the one or more suggested locations. In some implementations, a plurality of personalized itineraries may be generated for the user 106. The plurality of personalized itineraries may each include a different number and/or type of suggested transportation options, lodging options, and/or activities at the one or more suggested locations.

At 514, the itinerary application 208 may receive an indication, via the communications module 220, to alter the one or more of the suggestions (i.e., one or more locations, times at each location, transportation options, lodging options, and/or activities) in the generated personalized itinerary. The indication may also represent a change in travel preferences of the user 106, or may reflect a change in the behavior of the user 106. In some implementations, such an indication, if received, may be utilized as a further travel parameter input at 502, thus restarting process 500 for generating a personalized itinerary for the user 106. Furthermore, such indication may be saved as data in the preference input module 232 for future use in creating a personalized itinerary for user 106.

At 516, the itinerary may be provided to the user if no indication to alter the one or more suggestion is received.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving, by one or more computing devices, one or more inputs associated with a user, the one or more inputs indicating a travel destination to be visited by the user and one or more travel parameters;

accessing, by at least one computing device of the one or more computing devices, data associated with first previous travel behavior of the user and second previous travel behavior of a group of other users;

determining, based at least partly on the data, that the second previous travel behavior of one or more other users from the group of other users is similar to the first previous travel behavior of the user;

creating, based at least partly on the one or more travel parameters and the second previous travel behavior of the one or more other users, a travel itinerary for the user and with respect to a trip to the travel destination, the travel itinerary suggesting at least:

one or more locations at the travel destination and a first amount of time to spend at each location of the one or more locations;

one or more transportation options for transportation at least one of to and from the travel destination, between the one or more locations, or for transportation within the one or more locations;

one or more lodging options for lodging at the travel destination; and one or more activities, exclusive of the one or more transportation options and the one or more lodging options, for the user to engage in at the travel destination, and a second amount of time to spend at an activity of the one or more activities;

monitoring, by the one or more computing devices while the user is traveling on the trip, at least one of weather at the travel destination or a third amount of time that the user spends at the activity;

determining, while the user is traveling on the trip and by the one or more computing devices in an automated manner, that at least one of weather conditions or a weather forecast makes one of the one or more transportation options, one of the one or more lodging options, or one of the one or more activities unavailable, or that the third amount of time exceeds the second amount of time;

generating, by the one or more computing devices in an automated manner, an updated travel itinerary by updating the travel itinerary to account for the at least one of the weather conditions, the weather forecast, or the third amount of time exceeding the second amount of time, wherein the updated travel itinerary is linked to one or more applications that facilitate, in an automated manner, a purchase of at least one of transportation, lodging, or tickets that reflect the weather conditions, the weather forecast, or the third amount of time exceeding the second amount of time; and presenting the updated travel itinerary to the user.

2. The method as recited in claim 1, wherein the one or more travel parameters include at least one of a travel budget, travel time limitations, or the one or more activities at the travel destination.

3. The method as recited in claim 1, wherein the data associated with the first previous travel behavior of the user and the second previous travel behavior of the group of other users includes at least one of:

data associated with a previous travel destination of the user or the one or more other users;

data associated with transportation used at the previous travel destination of the user or the one or more other users;

data associated with lodging used at the previous travel destination of the user or the one or more other users; or data associated with one or more activities engaged in at the previous travel destination by the user or the one or more other users.

4. The method as recited in claim 1, wherein the one or more activities include at least one of visiting a landmark, visiting a museum, visiting a theme park, attending a performance, attending a sporting event, shopping, or dining.

5. The method as recited in claim 1, further comprising:

receiving, from the user, an indication to alter at least one of:
  the one or more travel parameters on which the travel itinerary is based; or
  the one or more locations, the one or more transportation options, or the one or more lodging options suggested in at least one of the travel itinerary or the updated travel itinerary; and based at least partly on the indication, generating, by the one or more computing devices, a second updated travel itinerary by updating the updated travel itinerary.

6. A system comprising:
one or more processors;
memory; and
one or more computer-executable instructions stored in the memory and executable by the one or more processors to:
  determine first travel preferences of a user based at least partly on data associated with the user, the data being at least one of received from the user, inferred from a behavior of the user, or determined from one or more data sources;
  determine one or more other users having second travel preferences that are similar to the first travel preferences of the user;
  determine a first interest of the user, a second interest of a first other user, and a third interest of a second other user;
  based at least on the first interest, the second interest, and the third interest, determine a first level of similarity between the user and the first other user and a second level of similarity between the user and the second other user, wherein the first level of similarity is higher than the second level of similarity;
  assign a first weight to the first other user based at least on the first level of similarity and a second weight to the second other user based at least on the second level of similarity, the first weight being greater than the second weight; and
  create a travel itinerary based at least partly on:
    the first travel preferences of the user; and
    the second travel preferences of the one or more other users, and at least one of the first weight or the second weight,
  the travel itinerary being associated with a travel destination of interest to the user and suggesting at least one of:
    one or more locations at the travel destination;
    one or more transportation options to and from the travel destination, within the one or more locations, or between the one or more locations;
    one or more lodging options at the travel destination; or
    one or more activities at the travel destination; and
  cause presentation of a control selectable by the user, wherein selection of the control facilitates a purchase of at least one of the one or more transportation options, the one or more lodging options, or the one or more activities.

7. The system as recited in claim 6, wherein the data determined from the one or more data sources includes data associated with:
a travel history of the user,
a rating history,
a review history,
a transaction history,
a social network history,
a geolocation history of a device associated with the user, or
an internet search history.

8. The system as recited in claim 6, wherein the one or more computer-executable instructions are further executable by the one or more processors to:

receive, from the user, an indication to alter at least one of the one or more locations, the one or more transportation options, the one or more lodging options, or the one or more activities; and based at least partly on the indication, update the travel itinerary.

9. The system as recited in claim 8, wherein the one or more computer-executable instructions are further executable by the one or more processors to:

based at least in part on updating the travel itinerary, cause presentation of a second control selectable by the user, wherein selection of the second control facilitates at least one of:

a cancellation of the purchase of the at least one of the one or more transportation options, the one or more lodging options, or the one or more activities; or a purchase of at least one of one or more updated transportation options, one or more updated lodging options, or one or more updated activities included in the updated travel itinerary.

10. The system as recited in claim 6, wherein the travel itinerary further suggests an amount of time to remain at the one or more locations or the one or more activities.

11. The system as recited in claim 6, wherein the second travel preferences of the one or more other users indicate that the one or more other users previously visited the travel destination, and that the one or more other users at least one of visited the one or more locations, utilized the one or more transportation options, utilized the one or more lodging options, or participated in the one or more activities.

12. The system as recited in claim 11, wherein the second travel preferences of the one or more other users indicate that the one or more other users previously visited a different travel destination that is determined to have characteristics similar to that of the travel destination.

13. The system as recited in claim 6, wherein the one or more computer-executable instructions are further executable by the one or more processors to:

present the travel itinerary to the user;

receive an indication from the one or more data sources in an automated manner to alter at least one of the one or more locations, the one or more transportation options, the one or more lodging options, or the one or more activities; and based at least partly on the indication in an automated manner, update the travel itinerary.

14. One or more non-transitory computer-readable media storing computer-executable instructions that, when executed by one or more processors, cause the one or more processors to perform acts comprising:

receiving, from a user device associated with a user, a first input of a first travel parameter and a second input of a second travel parameter, wherein at least one of the first travel parameter or the second travel parameter comprises a travel preference or a travel constraint;

accessing data associated with a previous behavior of the user;

associating the first input with a first category and the second input with a second category;

associating the data with at least one of the first category or the second category;

determining a first ranking for the first category and a second ranking for the second category according to a hierarchy of categories; and generating, based at least on the first input, the second input, the data, the first ranking, and the second ranking, a travel itinerary for the user, the travel itinerary linked to one or more applications that facilitate, in an automated manner, a purchase of at least one of transportation, lodging, or tickets, and the travel itinerary suggesting at least one of:

one or more locations within the travel destination;

one or more transportation options for at least one of to and from the travel destination, between the one or more locations, or within the one or more locations;

one or more lodging options at the travel destination; or one or more activities for the user to engage in at the travel destination, wherein the one or more activities are exclusive of the one or more transportation options and the one or more lodging options, and a suggested amount of time to engage in an activity of the one or more activities;

monitoring, while the user is traveling on a trip suggested by the travel itinerary, the actual amount of time that the user engages in the activity;

determining that the actual amount of time exceeds the suggested amount of time;

generating an updated travel itinerary by updating the travel itinerary to account for the actual amount of time exceeding the suggested amount of time, wherein the updated travel itinerary is linked to one or more applications that facilitate, in an automated manner, a purchase of at least one of transportation, lodging, or tickets that reflect the actual amount of time exceeding the suggested amount of time; and presenting the updated travel itinerary to the user.

15. The one or more non-transitory computer-readable media as recited in claim 14, wherein the acts further comprise:

receiving additional data associated with the user in an automated manner, the additional data indicating at least one of a desire to alter the travel itinerary, one or more travel preferences of the user, an adjustment to the travel preferences of the user, or an update to the previous behavior of the user; and generating the updated travel itinerary to additionally account for the additional data.

16. The one or more non-transitory computer-readable media as recited in claim 14, wherein the first travel parameter comprises an identity of the travel destination.

17. The one or more non-transitory computer-readable media as recited in claim 14, wherein the travel constraint includes at least one of a travel budget, travel time limitations, or the one or more activities.

18. The one or more non-transitory computer-readable media as recited in claim 14, wherein the previous behavior of the user includes at least one of:

previous travel behavior acquired from one or more data sources;

previous non-travel behavior acquired from one or more data sources; or previous travel behavior received or inferred from the user.

19. The one or more non-transitory computer-readable media as recited in claim 14, wherein the travel itinerary further includes one or more deals associated with the one or more transportation options, the one or more lodging options, or the one or more activities.

20. The one or more non-transitory computer-readable media as recited in claim 14, wherein the travel itinerary further suggests an amount of time to engage in the one or more transportation options.

* * * * *